UNITED STATES PATENT OFFICE.

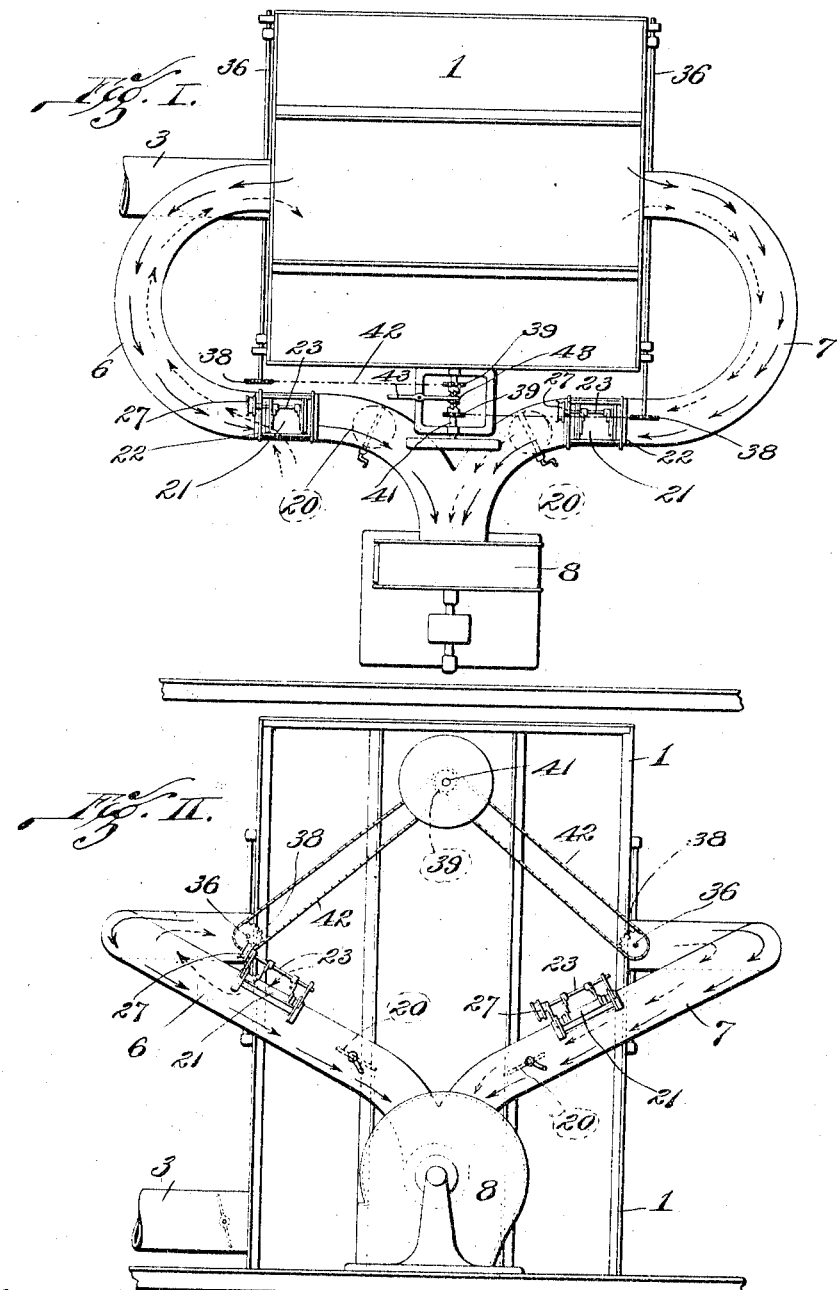

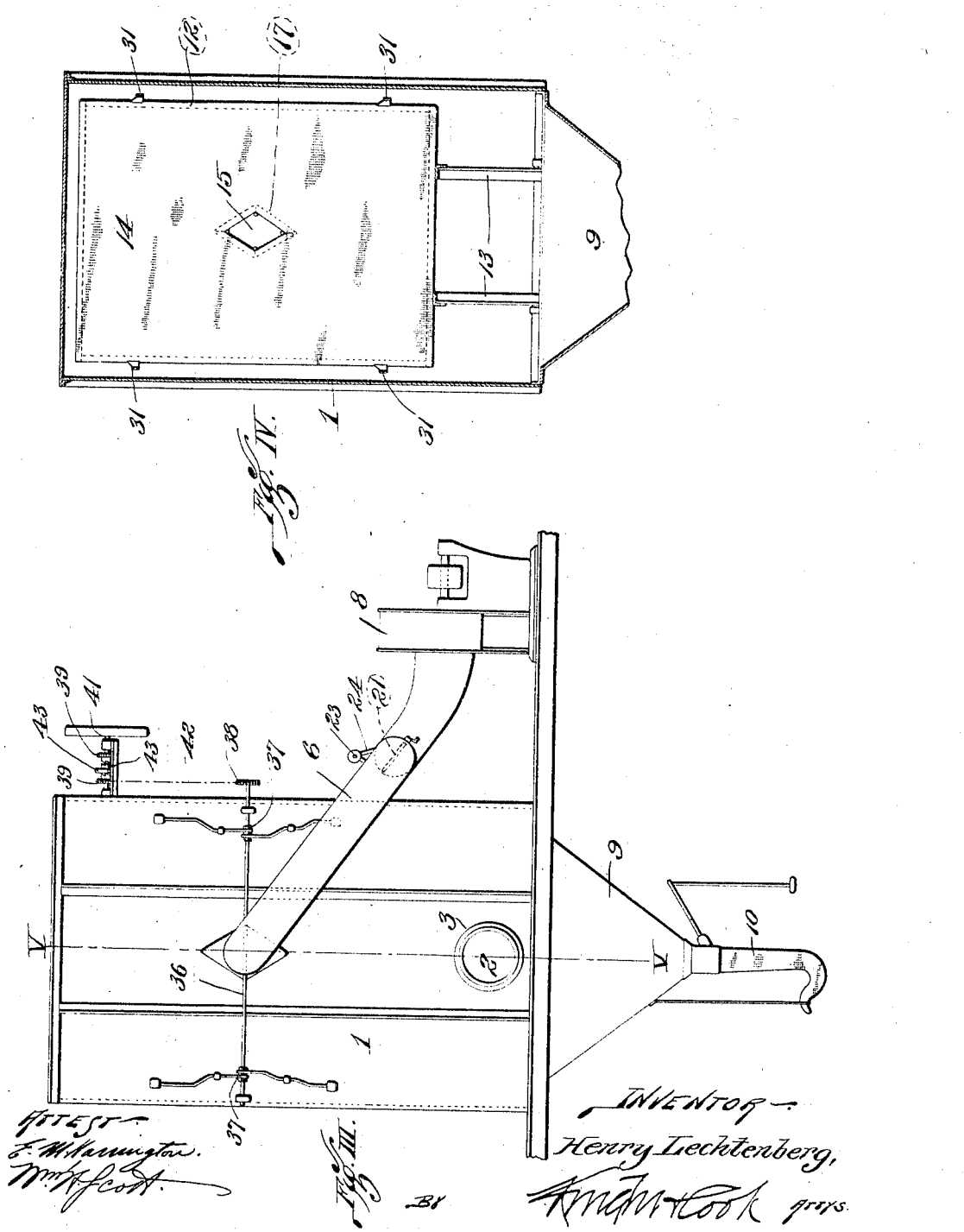

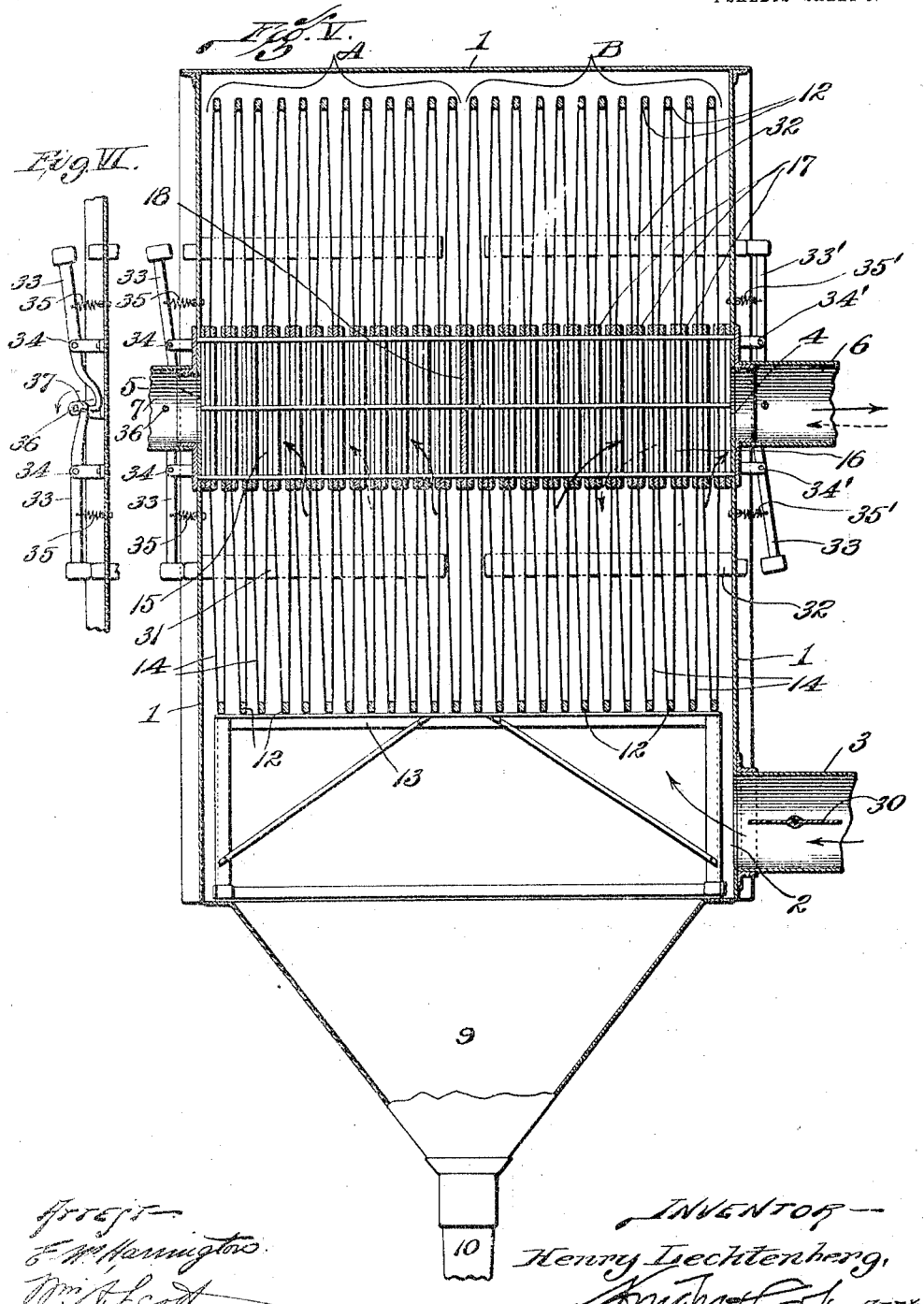

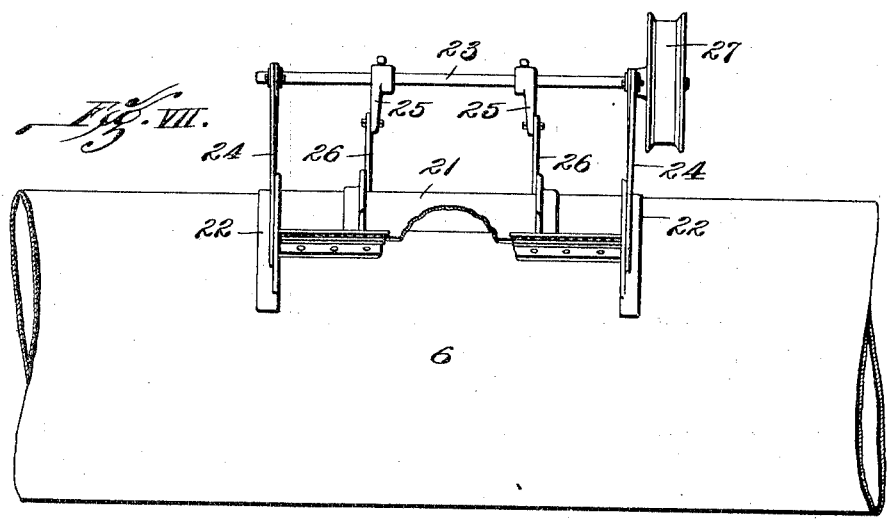
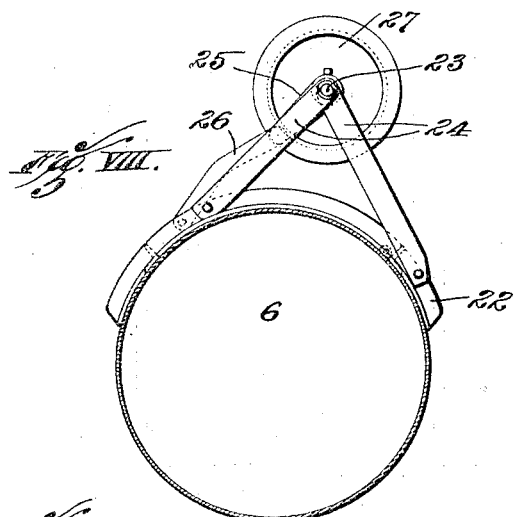
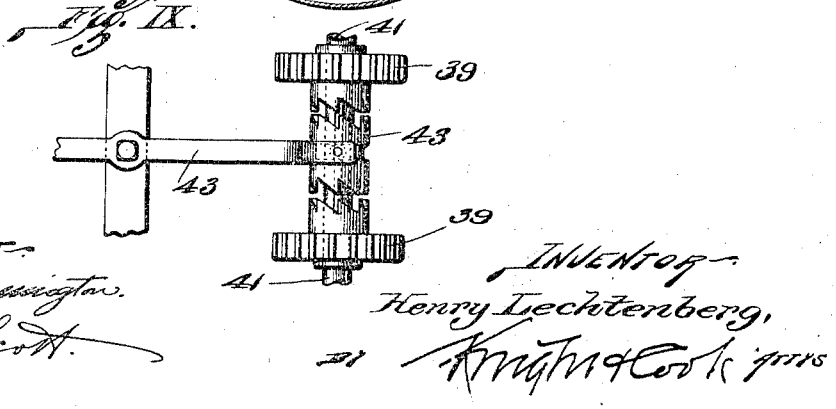

HENRY LECHTENBERG, OF QUINCY, ILLINOIS, ASSIGNOR TO W. T. LECHTENBERG.

DUST-COLLECTOR.

1,113,024.     Specification of Letters Patent.     Patented Oct. 6, 1914.

Application filed April 29, 1914. Serial No. 835,118.

*To all whom it may concern:*

Be it known that I, HENRY LECHTENBERG, a citizen of the United States of America, a resident of Quincy, in the county of Adams and State of Illinois, have invented certain new and useful Improvements in Dust-Collectors, of which the following is a full, clear, and exact description, reference being had to the accompanying drawings, forming a part of this specification.

My invention relates to a dust collector, the principal object being to produce a dust collector which is so constructed that the dust adhering to its filtering devices may be easily and quickly removed.

The invention also includes details of construction which will be hereinafter described.

The preferred form of my invention preferably comprises filtering devices arranged in a dust receiving housing suction pipes leading from said housing, and a fan for drawing filtered air through said suction pipes. Each suction pipe is associated with one of the filtering devices. When the dust collector is in operation dust laden air is admitted to the dust receiving housing and the dust collects on the surface of the filtering devices while the air passing through the filtering devices is discharged into the suction pipes. In cleaning the filtering devices one of the suction pipes is closed to prevent the flow of air from the filtering elements to said suction pipe, and a reversely moving air current entering said suction pipe flows through one of the filtering devices with the result of removing the dust from its filtering elements. The other filtering device may also be cleaned by closing its suction pipe and forcing air from said suction pipe into and through the filtering elements associated therewith.

Figure I is a top or plan view of my dust collector. Fig. II is a front elevation. Fig. III is a side elevation. Fig. IV is a vertical section showing one of the dust collecting screens. Fig. V is an enlarged vertical section taken approximately on line V—V, Fig. III. Fig. VI is a detail view showing the jarring devices at one side of the dust receiving housing. Fig. VII is an enlarged front elevation, showing one of the suction pipes and the closure secured thereto, a portion of the closure being broken away to show the inlet opening in the suction pipe. Fig. VIII is a side elevation of the parts shown in Fig. VII, the suction pipe being shown in section. Fig. IX is a detail view of the clutch and the drive wheels for the jarring devices.

In the accompanying drawings: 1 designates a dust receiving housing provided with an inlet opening 2, and 3 is a delivery pipe for conducting dust laden air to the inlet opening.

4 and 5 designate outlet openings formed in the side walls of the housing 1 through which the air is discharged from the housing. Suction pipes 6 and 7 lead from the outlet openings to an exhaust fan 8.

9 designates a hopper arranged below the housing 1 and provided with a dust receiving member 10 at its lower end. The filtering devices preferably comprise rectangular outer frames 12 mounted on a support 13 and the filtering material preferably consists of fabric webs 14 secured to said rectangular outer frames. Passageways 15 and 16 located in the filtering devices are formed by apertures in the fabric webs 14 and inner frames 17 secured to said webs. The outer frames 12 are separated from each other to admit the dust laden air to the filtering material and the inner frames 17 are separated from each other as seen in Fig. V to permit the filtered air to flow from the filtering material to the passageways 15 and 16.

The filter elements in the housing 1 constitute two filtering devices, designated A and B, in Fig. V. The passageway 15 is formed in the filtering device A while the passageway 16 is located in the filtering device B.

18 designates a division plate separating the passageway 15 from the passageway 16.

The operation of the dust collector is as follows: The exhaust fan 8 is operated to draw the dust laden air from the delivery pipe 3 to the filtering devices A and B and the dust collects on the filtering material 14 while the filtered air passing through said material is conducted through the passageways 15 and 16 and discharged into the suction pipes 6 and 7. In passing through the filtering devices the air is divided into two oppositely moving currents one of which flows out through passageway 16 and suction pipe 6 while the other passes through the passageway 15 and suction pipe 7.

Each of the suction pipes 6 and 7 is provided with a valve 20 (Fig. I) which may be closed to prevent the flow of air from the filtering devices to the exhaust fan 8. These valves are open during the filtering operation. Each suction pipe is also provided with an inlet opening located between its valve 20 and the filtering device, said opening being normally closed by a door or closure 21. Each of these closures (Fig. VII) is preferably hinged to a frame 22 secured to the suction pipe.

23 designates a door operating shaft journaled in supports 24 and provided with arms 25 connected to the door by means of links 26. A pulley 27 secured to the shaft 23 may be operated to rock the shaft and its arms 25, thereby opening or closing the door 21.

The filtering device B may be cleaned while the exhaust fan is in operation by closing a valve 30 in the delivery pipe 3 (Fig. I), to prevent the admission of dust laden air to the housing 1; and closing the valve 20 in the suction pipe 6 and opening the door or closure 21 on said suction pipe. The parts are then so positioned that the air supply cannot enter the housing through the main inlet opening 2, and in response to the action of the exhaust fan air is drawn through the apparatus in the direction indicated by the dotted arrows in Fig. I and Fig. V. The air enters the suction pipe 6 through the inlet opening at the door 21 on said pipe as indicated by the dotted arrows in Fig. I and this air flows into the housing 1 through the passageway 16 and filtering device B in a direction opposite to the direction of flow during the filtering process, see dotted arrows Fig. V. Therefore, the dust which has accumulated on the filtering material of the filtering device B is loosened and removed by the reverse air current flowing through said material. The air passing from the filtering device B flows through the filtering material of the filtering device A and is discharged through the suction pipe 7 leading to the exhaust fan. The suction fan may be operated with the parts positioned as just described for any desired length of time to thoroughly cleanse the filtering material of the filtering device B, and the door or closure 21 on the suction pipe 6 is then closed, and the valve 20 in the suction pipe 6 and the valve 30 in the inlet pipe 3 are opened to permit the flow of air from the filtering devices through the suction pipe 6 to the exhaust fan 8. This places the parts in their normal positions, and in response to the operation of the fan the air currents will flow in the direction indicated by the arrows shown in full lines Fig. I and Fig. V. It will be readily understood that the filtering device A may be cleaned by closing the valve 20 in the suction pipe 7 and opening the door or closure 21 on said suction pipe. The direction of flow of the air in the suction pipe 7 will then be reversed and the air current will flow from said suction pipe through the filtering material of the filtering device A and finally pass from the housing 1 through the suction pipe 6.

My dust collector is preferably provided with a jarring device adapted to shake or vibrate the filtering material when the direction of flow of the air is reversed to dislodge the dust from said material, and the jarring device is preferably so constructed that the filtering device A may be vibrated independently of the filtering device B. The object is to vibrate the filtering device through which the reverse air current is flowing without materially vibrating the other filtering device.

31 designates shaker bars connecting the frames of the filtering device A, and 32 designates similar bars connecting the frames of the filtering device B. Each filtering device is a yieldable structure which may be jarred by striking its shaker bars.

33 are hammers pivoted at 34, and 35 designates springs tending to pull said hammers into engagement with the shaker bars 31. Hammers 33′ pivoted at 34′ are pulled toward the shaker bars 32 by springs 35′. The means for moving the hammers away from the shaker bars comprises rotatable shafts 36 journaled in bearings on the side walls of the housing 1 and cam fingers 37 secured to said rotatable shafts. The cam fingers lie adjacent to the inner ends of the pivoted hammers as shown most clearly in Fig. VI, and these cam fingers may be rotated with the result of moving the hammers away from the shaker bars and thereafter releasing the hammers to permit the springs 35 to pull said hammers into engagement with the shaker bars. The means for driving the hammers at one side of the housing independently of the hammers at the other side of the housing comprises sprocket wheels 38 secured to the shafts 36, sprocket wheels 39 loosely mounted on a drive shaft 41, and a pair of sprocket chains 42 passing around the sprocket wheels 38 and 39. A clutch device 43 splined to the drive shaft 41 may be shifted into engagement with clutch teeth on the sprocket wheels 39. The clutch device includes a shifter lever for shifting the clutch member.

I claim:—

1. A dust collector comprising a housing having an inlet opening for the admission of a dust laden air current, a plurality of filtering devices arranged in said housing, each of said filtering devices being provided with an outlet passageway through which filtered air is discharged, suction pipes communicating with said outlet passageways, an exhaust fan for drawing air through said suction pipes, means for closing either of said suction pipes to prevent air from flowing outwardly through the outlet passageway of either of the filtering devices, normally closed closures adapted to be opened after a filtering operation to admit air into said outlet passageways from the exterior of the filtering devices, the exhaust fan being adapted to draw air into one of the filtering devices from its outlet passageway and thence into the suction pipe associated with the other filtering device.

2. A dust collector comprising a housing having an inlet opening for the admission of a dust laden air current, and a plurality of outlet openings, filtering devices between said inlet and outlet openings, suction pipes leading from said outlet openings adapted to receive air flowing from said filtering devices, an exhaust fan for drawing air through said suction pipes and the filtering devices associated therewith during the filtering operation, a valve for closing one of the suction pipes to prevent the flow of air from a filtering device to the said suction pipe, the last named suction pipe being provided with an inlet opening through which air may flow from the exterior of said housing and a closure adapted to be opened after the filtering operation to admit a current of air from the exterior of the housing into the last mentioned suction pipe, and means for controlling the movement of said air currents whereby the last mentioned air current entering a suction pipe is caused to flow into and through a filtering device in response to the movement of an air current in another filtering device.

3. A dust collector provided with filtering devices each having outlet opening through which air is discharged during the filtering operation and through which air is admitted during the cleaning operation, suction pipes leading from said outlet openings, each of said suction pipes being provided with an inlet opening for the admission of air during a cleaning operation, means for opening and closing said inlet openings, a suction device for drawing air through said suction pipes during the filtering and cleaning operations, closures associated with said suction pipes to prevent the flow of air from either of the filtering devices to the suction pipe leading therefrom, said closures being operable to permit the flow of air through both of the suction pipes and to the suction device during the filtering operation, and said closures being adapted to close one of the suction pipes during the cleaning operation so that the air current produced in response to the operation of said suction device will flow through the filtering devices successively and into the other suction pipe thereby removing dust from one of the filtering devices.

4. A dust collector comprising a housing open to receive dust laden air, filtering devices in said housing adapted to receive the dust, suction pipes communicating with both of said filtering devices adapted to receive the filtered air, and a suction device for drawing air through said suction pipes and filtering devices thereby drawing dust laden air to said filtering devices; combined with means for deflecting the air so that the air current produced in response to the operation of said suction device will flow through the filtering devices successively and then through one of the suction pipes to said suction device, thereby removing the dust from one of said filtering devices.

5. A dust collector comprising a housing open to receive dust laden air, filtering devices in said housing adapted to receive the dust, suction pipes communicating with both of said filtering devices adapted to receive the filtered air, and a suction device for drawing air through said suction pipes and filtering devices thereby drawing dust laden air to said filtering devices; combined with closures associated with said suction pipes for deflecting the air so that the air current produced in response to the operation of said suction device will flow into one of the suction pipes, through the filtering devices successively and then through another of the suction pipes, thereby removing the dust from one of said filtering devices.

6. A dust collector provided with filtering devices each having an outlet opening through which air is discharged during the filtering operations and also during cleaning operations, and a suction fan, each of said filtering devices being provided with a suction pipe for conducting air to said suction fan during the filtering operations as well as during cleaning operations, the dust receiving sides of said filtering devices being in open communication with each other so that dust is delivered to all of said filtering devices at the same time in response to the movement of the air currents moving to said fan, combined with deflectors for closing either of said suction pipes at a point between said fan and filters and closures adapted to be opened to admit air to the outlet opening of either of said filters, whereby either filtering device may be placed in communication with the suction pipe of another filtering device so as to permit the flow of an air current through the filtering devices successively and into the suction pipe of one of the filtering devices in response to the operation of said suction fan.

7. A dust collector comprising a housing having an opening for the reception of dust laden air, two filtering devices in said housing adapted to receive the dust, air conducting members communicating with both of said filtering devices adapted to receive the filtered air flowing from said filtering devices, and a suction device for drawing air through said air conducting members and filtering devices thereby drawing dust laden air to both of said filtering devices; combined with means for deflecting the air so that the air current produced in response to the operation of said suction device will flow into one of said air conducting members, then through the filtering devices successively and thereafter through the other air conducting member to said suction device, thereby removing the dust from one of said filtering devices.

HENRY LECHTENBERG.

In the presence of—
  H. C. SPRICK,
  C. A. LECHTENBERG.